United States Patent [19]
Cho et al.

[11] Patent Number: 5,510,573
[45] Date of Patent: Apr. 23, 1996

[54] METHOD FOR CONTROLLING A MUSCIAL MEDLEY FUNCTION IN A KARAOKE TELEVISION

[75] Inventors: Jung H. Cho; Sang S. Lee, both of Suwon, Rep. of Korea

[73] Assignee: Samsung Electronics Co., Ltd., Kyungki-do, Rep. of Korea

[21] Appl. No.: 268,941

[22] Filed: Jun. 30, 1994

[30] Foreign Application Priority Data

Jun. 30, 1993 [KR] Rep. of Korea ............... 93-12406

[51] Int. Cl.⁶ ............... G09B 15/04; G10H 1/36; H04N 5/76
[52] U.S. Cl. ............... 84/610; 84/634; 84/477 R; 84/DIG. 6; 358/335
[58] Field of Search ............... 84/601, 602, 609–614, 84/634–638, 477 R, 478, DIG. 6; 358/342, 343, 335, 341

[56] References Cited

U.S. PATENT DOCUMENTS 5,245,600  9/1993  Yamauchi et al. ............ 358/343 X
5,250,745  10/1993  Tsumura ............ 84/609 X

*Primary Examiner*—Stanley J. Witkowski
*Attorney, Agent, or Firm*—Sughrue, Mion, Zinn, Macpeak & Seas

[57] ABSTRACT

A method for controlling a musical medley function in a karaoke television includes steps for randomly selecting song from a class of songs having similar form or theme, and continuously playing songs from the selected class. The user sets a minimum reference mark and the target number of challenging songs. Each song performed is graded, thus allowing the singer to proceed to a next song only when the graded mark exceeds the reference mark. The method includes a step for providing a celebrator message and fanfare when the number of played songs equals the target number of challenging songs, thereby prompting the user to take added interest in singing. The method is adaptable in karaoke televisions and is particularly useful in household karaoke televisions.

6 Claims, 5 Drawing Sheets

METHOD FOR CONTROLLING A MUSCIAL MEDLEY FUNCTION IN A KARAOKE TELEVISION

BACKGROUND OF THE INVENTION

1. Field of the Invention

The present invention relates to a method for controlling a musical medley function in a television incorporating a karaoke player. More particularly, the present invention relates to a method for controlling a musical medley function in a karaoke television, wherein the medley function permits the user to select a minimum score or mark and a target number of challenging songs. Then the karaoke machine randomly plays selected songs in seriatim until the user's score falls below the minimum mark or the target number of songs have been completed. The medley function is executed only while the user's mark exceeds the target mark and the number of played songs is smaller than the target number of challenging songs. The medley function terminates when the graded mark is lower than the minimum mark or the number of played songs is the same as the target number of challenging songs. The medley function is provided as an enhancement to the simultaneous reproduction of video and background music of the karaoke television to stimulate user interest.

Korean Patent Application No. 93-12406 is incorporated herein by reference for all purposes.

2. Description of the Prior Art

Generally, television receivers are provided with an external signal input terminal for receiving video and audio signals from external apparatuses. These video and audio signals may be supplied from a video cassette recorder, a camcorder, or a karaoke player. The signals input via the external signal input terminals can be monitored using a cathode ray tube (CRT) and speakers. A user can select between a received television signal or an externally produced video and/or audio signals received via the external signal input terminals. The selection is made by manipulating an operation mode button installed on the television receiver or by operation of a remote controller for controlling the television receiver.

A karaoke player is a system provided with a television monitor for displaying word information accompanied by music. Such an apparatus can take several forms, the most common being LD player system incorporating laser disc player, a CDG player systems including a compact disc graphic player, and a computerized player systems using a memory.

LD player systems provide excellent video and sound quality. However, the number of songs recorded on a single laser disc is restricted to approximately thirty (30). Thus, a LD player system requires a disc changing apparatus, such as that found in a jukebox, in order to play selections from a large number of songs.

CDG player systems provide sound quality only slightly inferior to that provided by LD player systems. However, CDG player systems provide only a limited amount of still image information. This information is recorded on a subcode channel of the compact disc, and the relation between the picture and music in the CDG player systems is lower than that of LD systems. Moreover, the number of songs recorded on the compact disc is restricted to approximately fifteen (15). Therefore, a disc changing apparatus similar to that found in LD player systems is required.

It is noted that the computerized player system cannot provide the excellent sound quality of the player systems discussed above. However, the computerized system is advantageous in that accompaniment-music and word information for 1,000 to 1,500 songs can be provide from memory. In addition, music selection can be performed at a high speed.

A system will be briefly described with reference to FIG. 1, which illustrates a high level block diagram of a computerized karaoke player using a memory. The system can be connected to both a general purpose monitor and an audio amplifier. The computerized system thus provides both a stereophonic accompaniment-music signal and word information in the form of characters.

When a specific song is selected in the system of FIG. 1 by means of a command input portion 1 and an accompaniment-music start signal is received, a controller 2 controls an accompaniment-music signal generator 3 to generate accompaniment-music for the designated song. At the same time, the controller 2 controls a character signal generator 4 to produce the lyric information for the designated song. An audio signal received through an audio input portion 5 is mixed with the accompaniment-music signal in a mixer 6 and is supplied to the audio amplifier through at least one audio output terminal. The output from the character signal generator 4 supplies lyrics to the monitor to allow the user to sing song along with the accompaniment music.

However, the above-described computerized karaoke player requires separate monitors for processing the accompaniment-music signal and word signal. An amplifier is also required. In other words, the user must purchase at least two kinds of apparatuses.

Furthermore, since the computerized karaoke player system has its own command input portion, the user must separately manipulate controls for the television receiver in addition to manipulating controls dedicated to the karaoke player system. This is inconvenient for the user.

In order to solve the inconvenience due to the separated computerized karaoke player system and the television receiver, it has been proposed that the computerized karaoke player be accommodated in the television set by including the video/accompaniment-music signal generating portion. This would allow the output of the karaoke player system to be processed and output through the conventional television monitor and amplifier. However, the proposed device still has a disadvantage, i.e., the karaoke/television system does not spark or hold the user's interest for long. The present invention is directed to a method for increasing the user's interest by challenging the user's singing proficiency.

SUMMARY OF THE INVENTION

The principal object of the present invention is to provide a method for controlling execution of a musical medley function in a television including a karaoke player, wherein the user determines a minimum musical mark and the user is graded for each song. The machine plays additional songs while the user's mark exceeds the selected reference mark or until a target number of songs has been played. The television/karaoke player permits the user to sing a song accompanied by background music and corresponding words. In an exemplary case, the lyrics are erased after the music of the song advances past the accompanying words.

This and other objects, features and advantages according to the present invention are provided by a method for controlling a musical medley function in a karaoke television. The method includes steps for:

displaying an initial screen and classes of songs in response to input of a medley function key;

operating numerical keys to select a class of song;

determining the received number from the numerical keys;

supplying the class of songs corresponding to the selected numerical keys;

setting a minimum mark and the target number of challenging songs;

determining whether a performance start command is received or not;

displaying the title of a song randomly chosen from the selected class of songs when the performance start command is received;

providing lyrics, background picture, accompaniment information corresponding to the displayed title and starting the accompaniment music and song;

determining whether the song is finished or not;

grading the user's performance of the song;

determining whether the user's graded mark exceeds the minimum mark when the song is finished;

continuing play of the next randomly chosen accompaniment music background, and lyrics only when the mark exceeds the minimum mark; and determining whether the currently-played number of songs is the same as that of the target number of songs when the graded mark exceeds the initially-set minimum mark, to thereby continuously produce accompaniment music, background, and lyrics when the number of the played songs and target number differ from each other, and to display a celebration message when the number of the played songs and target number are equal.

BRIEF DESCRIPTION OF THE DRAWINGS

The above objects and other advantages of the present invention will become more apparent by describing in detail preferred embodiments with reference to the attached drawings in which.

DETAILED DESCRIPTION OF THE PREFERRED EMBODIMENT

Figure 1:
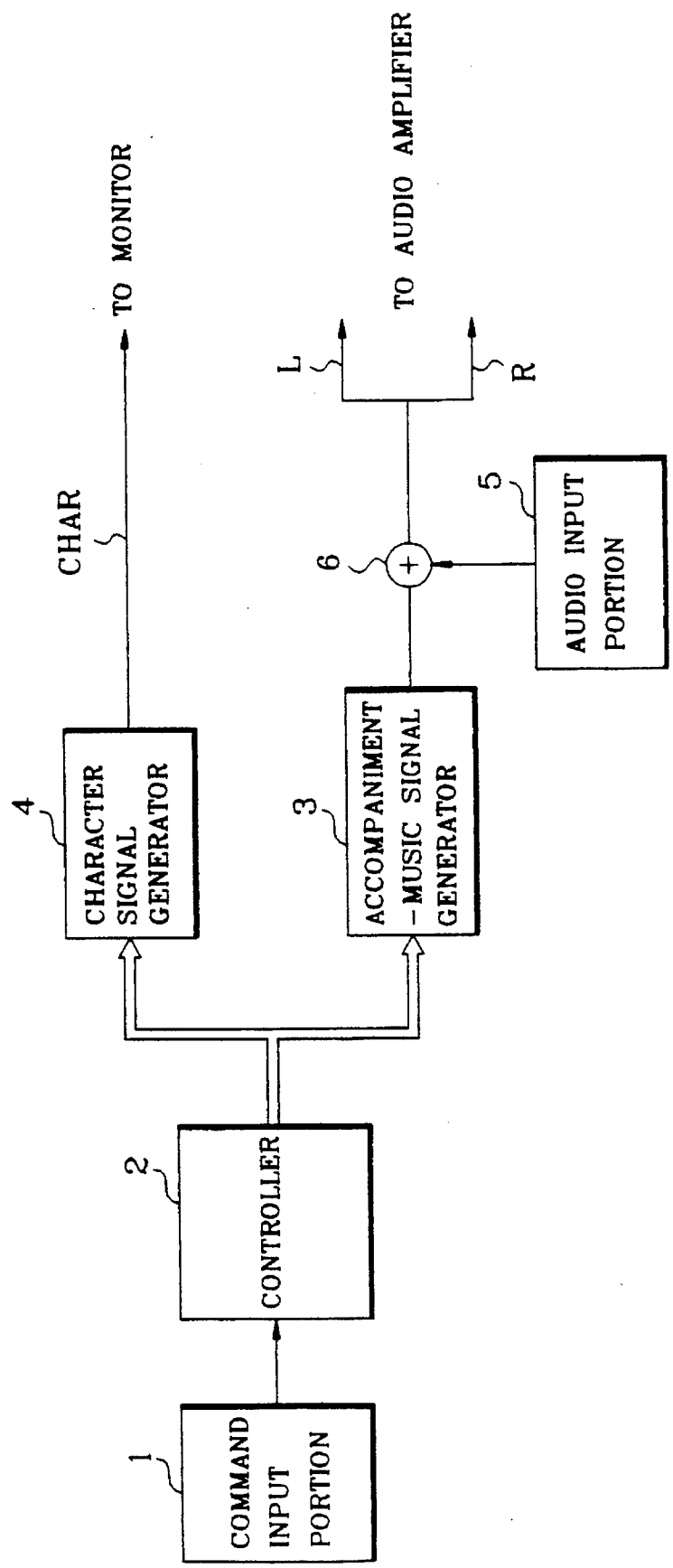
FIG. 1 is a high level block diagram showing a computerized karaoke player operated according to a conventional technique.
Figure 2:
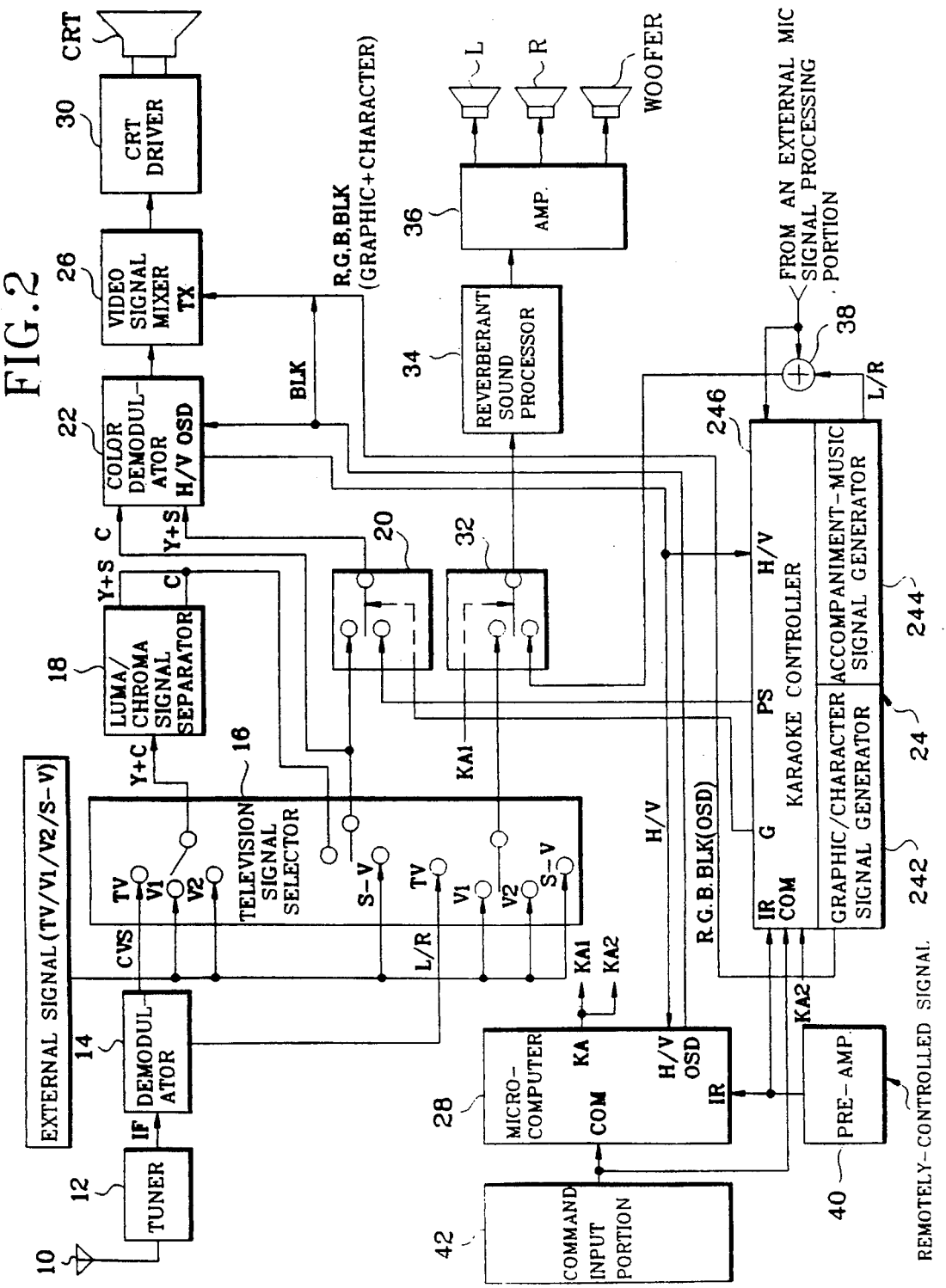
FIG. 2 is a schematic block diagram showing a karaoke television according to the present invention.
Figure 3:
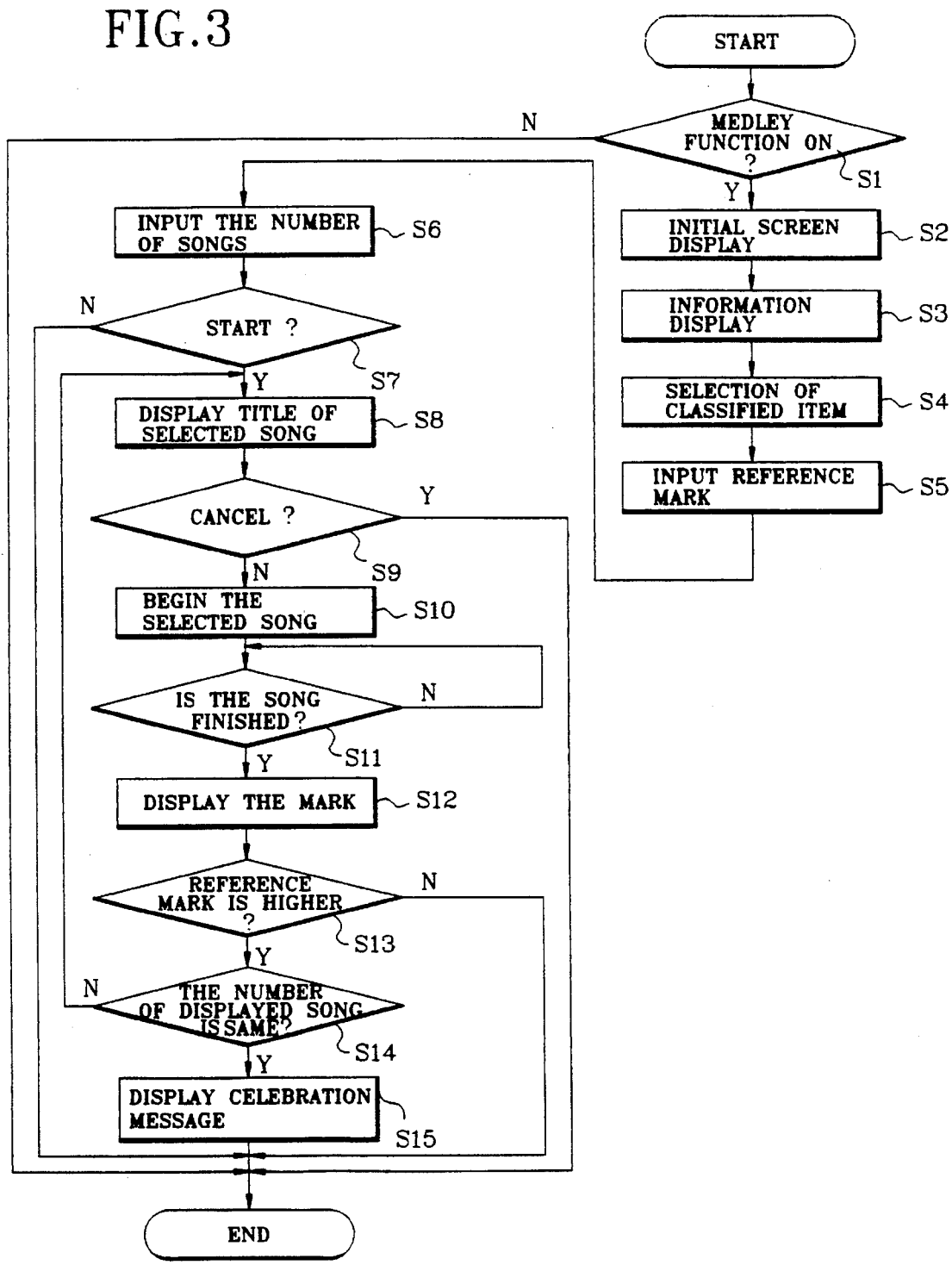
FIG. 3 is a flow chart showing essential and supporting operational steps included in a method for controlling a medley function in a karaoke television according to the present invention.

FIG. 2 is a low level block diagram which illustrates a karaoke television which is suitable for performing the inventive method illustrated in FIG. 3. Preferably, the television is divided into a video system and an audio system.

In considering the operation of the television & karaoke player, the function for overall operation such as the channel selection, video selection and volume adjustment are carried out. In connection with the operation of the karaoke player, the overall functions of song selection, tune and speed control, and pre-programming are also carried out.

With respect to a video mode accompanied by music, an audio signal is supplied only by means of the karaoke player, but a video signal can be supplied from a broadcast signal of a selected channel, an externally-supplied signal, or a signal from a video/accompaniment-music signal generating to supply a picture corresponding to a song.

In view of the operation of the video system, a tuner 12 converts a broadcasting signal which is a radio frequency (RF) signal, received via an antenna 10, into an intermediate frequency (IF) signal to output the IF signal to a demodulator 14. The demodulator 14 separates the IF signal from the tuner 12 into a composite video signal CVS and L/R audio signals and supplies the output to a television signal selector 16. Here, the television signal selector 16 also receives externally-supplied signals, i.e., signals V1 and V2 from first and second video signal sources (not shown) and a signal S-V from a super VHS signal source (not shown).

The television signal selector 16 selects any one of the received video signals CVS, V1 and V2 and supplies the selected signal to a luma/chroma signal separator 18. The signal separator 18 separates the video signal selected by the television signal selector 16 into a luma signal Y+S having a composite sync signal and a chroma signal C. The luma signal Y+S is supplied to one input terminal of a first selector 20, and the chroma signal C is supplied to a color demodulator 22. Meanwhile, other input terminal of the first selector 20 is supplied with a pseudo sync signal PS generated from a video/accompaniment-music signal generating portion 24. The signal Y+S or PS selected by the first selector 20 is supplied to the color demodulator 22.

On the other hand, if the super VHS signal S-V is selected in the television signal selector 16, the super VHS signal S-V is directly supplied to the color demodulator 22 and the first selector 20 without passing through the luma/chroma signal separator 18.

The first selector 20 is controlled by a graphic mode signal G generated from the video/accompaniment-music signal generating circuit. Preferably, when the graphic mode signal G is in a "high" state, the pseudo sync signal PS supplied from the video/accompaniment-music signal generator 24 is selected as an output; while the video signal supplied from the television signal selector 16 is selected in case G is in a "low" state.

The chroma signal C and luma signal Y+S having the composite sync signal supplied to the color demodulator 22 are demodulated as color difference signals R-Y, B-Y, G-Y, and -Y and are supplied to a video signal mixer 26. A sync signal H/V detected from the composite sync signal the luma signal Y+S is supplied to the video/accompaniment-music signal generator 24 and a microcomputer 28.

An on screen display ("OSD") signal is supplied from the microcomputer 28 to the color demodulator 22 is mixed with the demodulated color difference signal and supplied to the video signal mixer 26.

Another input of the video signal mixer 26 is supplied with the graphic signal and character signal from the video/accompaniment-music signal generator portion 24 in the form of R,G,B and BLK signals, which are mixed with the color difference signal from the color demodulator 22. The mixing result is supplied to a cathode ray tube (CRT) driver 30. Preferably, the microcomputer 28 controls supply of a blanking signal BLK-OSD and the blanking signal BLK from the video/accompaniment-music signal generator 24 to the video signal mixer 26. By the output of the blanking signal BLK, the signals are processed in the order of the OSD signal from the microcomputer 28, the graphic signal and character signal from the video/accompaniment-music signal generator 24, and then the signal from the television signal selector 16.

With respect to operation of the audio system, an audio signal SVBS, V1, V2 or S-V selected by the television signal selector 16 is supplied to a second selector 32. When a television mode is selected by the microcomputer 28, the second selector 32 selects the audio signal supplied from the television signal selector 16. If a video mode accompanied with music is selected, the second selector 32 selects the accompaniment-music signal supplied from the video/accompaniment-music signal generator 24 to output the selected signal to an audio output apparatus. In other words, the signal from the second selector 32 is supplied to a reverberant sound processor 34 where it is subjected to processing and equalization. The audio signal is then supplied to an amplifier 36. The signals amplified by amplifier 36 are provided as an audio output to speakers L, R and woofer.

An audio mixer 38 mixes a voice received through a microphone (not shown) with the accompaniment-music signal from the video/accompaniment-music signal generator 24 to supply the result to the second selector 32.

Preferably, as shown in FIG. 2, the video/accompaniment-music signal generator 24 includes a graphic/character signal generator 242 for generating the graphic/character signal, and an accompaniment-music signal generator 244 for generating accompaniment music. Furthermore, a karaoke controller 246 controls the graphic/character signal generator 242 and accompaniment-music signal generator 244 and generates a pseudo sync signal. An external interface (not shown) advantageously receives externally available graphic/character information and sound source information to supply as input to the graphic/character signal generator 242 and the accompaniment-music signal generator 244.

The graphic/character signal generator 242 advantageously may include constituents (not shown) such as a graphic memory for storing graphic information, a character memory for storing character information, a graphic/character processor for combining the graphic information from the graphic memory with the character information read out from the character memory, and a digital-to-analog converter for processing an output of the graphic/character processor via a digital to analog conversion and then supplying the result of the conversion to other components.

The accompaniment-music signal generator 244 advantageously may include constituents (not shown) such as a sound source memory for storing sound source information, a sound source information processor for receiving the sound source information read out from the sound source memory and converting the received sound source information into the accompaniment-music signal, and a digital-to-analog converter for converting an output signal of the sound source information processor to supply the result. Preferably, the sound source information stored on the sound source memory is MIDI-information.

The karaoke controller 246 may also advantageously include constituents (not shown) such as a processor for controlling the graphic/character signal generator 242 and accompaniment-music signal generator 244 according to a predefined operating program. In addition to the processor, an interface preferably performs a remote-input command from a remote controller (refer to FIG. 5A) or direct-input command from a built-in command input portion (refer to FIG. 5B) and supplies the command to the processor. A sync signal generator produces the pseudo sync signal PS, which is the same as the sync signal of the television signal.

Figure 5A:
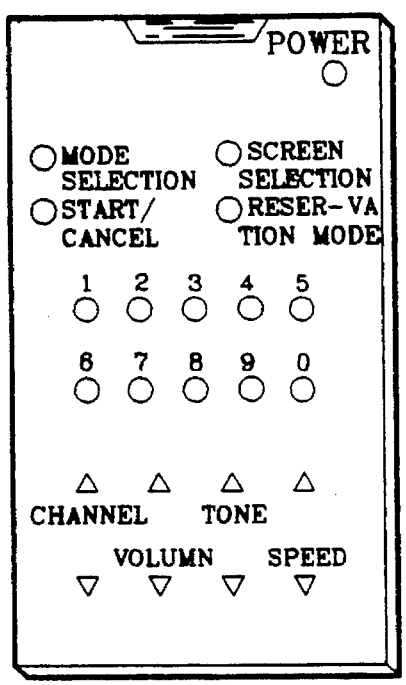
FIG. 5A is a front view showing a remote controller.
Figure 5B:
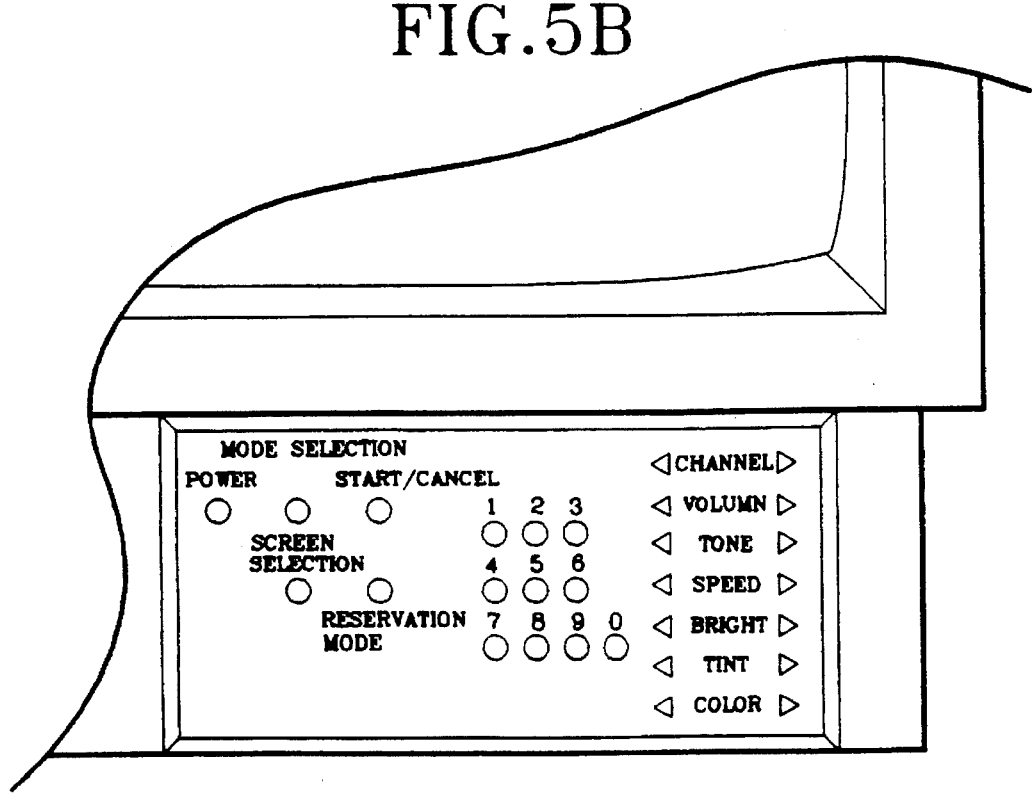
FIG. 5B is a partially cut-away front view showing a built-in command input portion of the television.

A preamplifier 40 interfaces the control command supplied from the remote controller shown in FIG. 5A to the microcomputer 28, as shown in FIG. 5B. The command input portion 42 is provided with at least one mode selection key for selecting the television mode or video mode accompanied with music, a screen selection key for selecting the video signal with respect to the accompaniment music, a numerical pad, a start/cancel key, a reservation key, a tone adjustment key and a speed-control key.

Preferably the karaoke player is integrally formed within the television to allow the user to conveniently use it. The operational steps for a method for controlling execution of the medley function in the karaoke television of FIG. 2 according to the present invention will be described with reference to FIG. 3.

The microcomputer 28 determines whether the medley function is selected or not (S1). When the microcomputer determines that the medley function is selected, it controls the video/accompaniment-music signal generating portion 24 to output initial screen information which is in turn supplied to the CRT to be displayed (S2). The initial screen information is the title of a program.

Figure 4A:
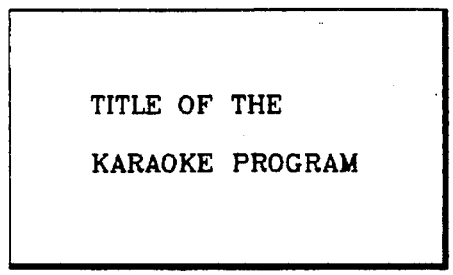
FIG. 4A to FIG. 4H show the characteristic part of screen displayed during corresponding operational steps illustrated in FIG. 3.
Figure 4B:
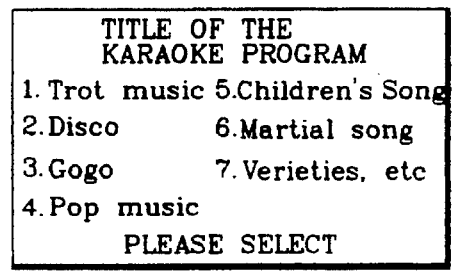

The microcomputer 28 controls the video/accompaniment-music signal generator 24 to supply information with respect to classes of songs, and this information is supplied to the CRT to be displayed (S3). The information displayed, as shown in FIG. 4B includes 1. Trot music, 2. Disco music, 3. Gogo music, 4. Pop music, 5. Children's song, 6. Martial song and 7. Varieties.

When the user selects numerical keys on the remote controller (shown in FIG. 5A) or the command input portion (shown in FIG. 5B), the control signal corresponding to the selected numerical keys and associated with to the class is supplied to the microcomputer 28 via the preamplifier 40 when then remote controller is used. The signal is supplied directly to the microcomputer 28 when the command input 42 is used. The microcomputer 28 stores the kinds of the music corresponding to the selected numerical keys (S4).

The user provides a minimum mark to the microcomputer 28 (S5). For example, in order to allow the user to proceed to a next song only if a score of 70 or better is achieved, on a completed song the minimum mark is set to 70. The input of the reference mark is directly performed by means of the numerical keys on the remote controller or command input portion.

The user enters the target number of songs through the numerical keys on the remote controller or command input. If he intends to attempt 15 songs, 15 is input as the number target.

Then, the microcomputer 28 determines whether a performance start command is received or not. If it is not received, the medley function is canceled and all steps are finished (S7). When the performance start command is received, the microcomputer 28 supplies the control signal to the video/accompaniment-music signal generator 24. The video/accompaniment-music signal generator 24, when supplied with the control signal, selects songs on a random basis from the class of songs selected and displays the title of the randomly selected song (S8).

The microcomputer 28 next determines whether the cancel key is received or not. The process ends when it is determined that the cancel key is received (S9). If the cancel key is not received, the microcomputer 28 supplies word lyrics information, background picture information and accompaniment-music information for the song displayed on the screen and played through speakers L, R and woofer. The music then begins playing (S10).

The microcomputer 28 determines whether the song is finished or not, and, if it is not finished, it continuously repeats the check and thereby determines the end of the song (S11).

When it determines that the song is finished, the microcomputer 28 grades the user's performance of the song, and supplies a control signal corresponding to the user's mark to the video/accompaniment-music signal generator 24 to allow the mark to be displayed on the CRT (S12). The microcomputer 28 then determines whether the displayed mark exceeds the reference mark or not. The process ends if the mark is lower than the reference mark (S13).

When the displayed mark user's exceeds the initially-set reference mark, the microcomputer 28 determines whether the number of the songs played is equal to the target number of songs. If the number of played songs and the target number are different, the program returns to step S8 and displays the title of the next song randomly-selected next song and repeats the steps S9–S14.

When the number of the songs played equals the target number of challenging songs, the microcomputer 28 supplies the control signal to the video/accompaniment-signal generator 24, which simultaneously displays the character information to the CRT and outputs accompaniment-music signal to the supplies the character information and accompaniment-music signal to the CRT and speakers to display a preset celebrator message and fanfare indicating that the medley function has been completed (S15).

When the user selects the medley function key on the remote controller or command input, the control signal corresponding to the medley function key is supplied to the microcomputer 28 which in turn determines whether the medley function key is received or not. If the medley function key is received, the microcomputer 28 supplies the control signal to the video/accompaniment-music signal generator 24. In response, the generator 24 supplies the initial screen information to the CRT which then displays the initial screen information. At this time, the initial screen information may be arbitrarily set by the user. An example of initial screen information is displayed on the CRT as shown in FIG. 4A.

When a predetermined time (e.g., 3–4 seconds) elapses after the initial screen information is displayed on the CRT, the microcomputer 28 supplies a control signal to the signal generator 24. The generator supplies information about the classes of songs to the CRT, and the CRT displays the information from the signal generator. Preferably, the classes are displayed on the CRT as shown in FIG. 4B.

Figure 4C:
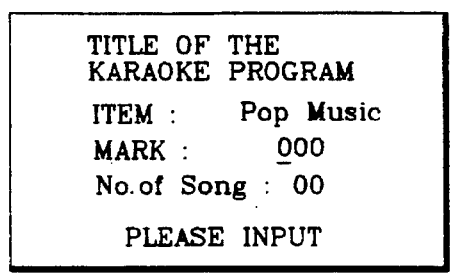
Figure 4D:
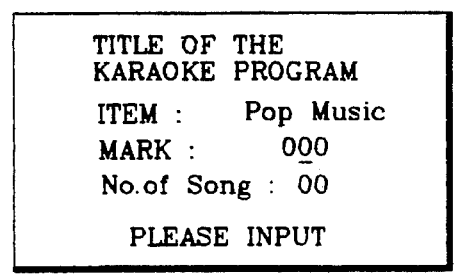
Figure 4E:
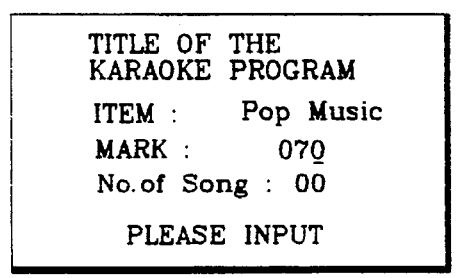
Figure 4F:
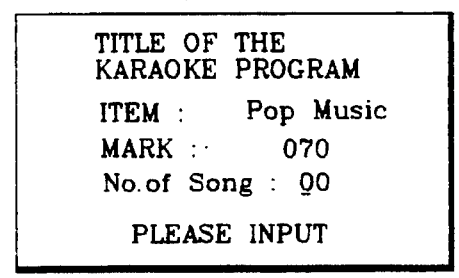
Figure 4G:
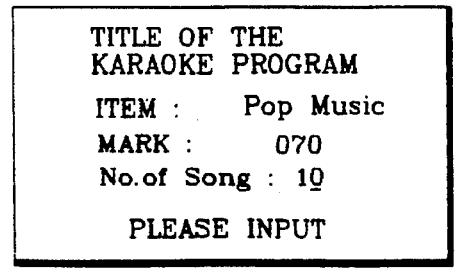
Figure 4H:
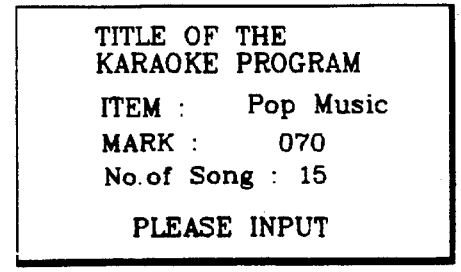

When the user presses the key number 4 to select pop music, the control signal corresponding to the key number 4 is supplied to the preamplifier 40 or the command input portion 42, and is transmitted to the microcomputer 28. Successively, the microcomputer 28 supplies the control signal to the generating 24 which, when supplied with the control signal, provides the information as shown in FIG. 4C to the CRT. The CRT displays the information from the video/accompaniment-music signal generator 24.

The user inputs the minimum reference mark and target number of challenging songs in response to the request for information displayed on the CRT as shown in FIG. 4C. The illustrative case where a mark of 70 as the reference mark and 15 is the target number of challenging songs is entered by a user is shown in FIG. 4C to FIG. 4H. Preferably that, once a desired number is received at the place denoted by the cursor __, the cursor automatically shifts to the next position. The cursor then automatically disappears upon completion of the input of the numbers with respect to a finally-designated position.

Thereafter, the microcomputer 28 determines whether the performance start key is received or not. If it is received, the microcomputer 28 supplies the control signal to the video/accompaniment-music signal generating portion 24 to output the title of the randomly selected song in the selected class. The title of the song from the video/accompaniment-music signal generating portion 24 is supplied to the CRT for display.

The microcomputer 28 then checks whether the cancel key is received or not. If the cancel key is not received, the microcomputer 28 supplies the control signal to the video/accompaniment-music signal generating portion 24 to display the lyric and background picture information of the randomly selected song on the CRT at the same time the accompaniment-music signal is supplied to the speakers L, R and woofer to provide the accompanying music for the first song.

When the first song is completely played, the microcomputer 28 grades the user's performance of the currently-completed song and supplies the control signal to the signal generator 24 to supply the information about the user's mark for the respective song to the CRT for display.

The microcomputer 28 compares the displayed mark with the reference mark. All medley function steps terminate when the displayed mark is lower than the reference mark or upon determining that the number of songs played is the same as the target number of challenging songs.

If the microcomputer determines that the number of songs played differs from that the target number, the microcomputer 28 supplies the control signal to the video/accompaniment-music signal generator 24 to randomly select the next song to be played and displays the title of the song, thereby repeatedly executing the succeeding steps.

Meanwhile, if the microcomputer determines that the number of songs played is the same as that of the target number, the microcomputer 28 establishes that all challenging songs initially set by the user have been played. The microcomputer supplies the control signal to the video/accompaniment-music signal generator 24 which then supplies the preset celebrator message and fanfare to the CRT and speakers L, R, and woofer.

According to the method for controlling a medley function in a television including with a karaoke player as described above, the method for controlling the medley function, which determines whether the medley function is continued or not, is based on the proficiency of the user. The medley function increases user interest by challenging a user to perform a target number of songs above a minimum level of proficiency.

While the present invention has been particularly shown and described with reference to a particular embodiment, it will be understood by those skilled in the art that various changes in form and details may be effected without departing from the spirit and scope of the invention as defined by the appended claims.

What is claimed is:

1. A method for controlling execution of a medley function in a karaoke television including an input device for selecting operating functions and numerical settings, said method comprising the steps of:

(a) displaying an initial screen indicating a medley function by displaying classes of songs;

(b) selecting one of said classes of songs displayed during said step (a) as a selected song class;

(c) defining a minimum mark and a target number of songs to be reproduced from said selected song class by entering respective first and second numerical values through the input device;

(d) continuously playing randomly selected songs from said selected song class seriatim on the karaoke television by providing accompaniment music, lyrics, and background scenes for each song until a predetermined ending condition is satisfied; and (e) ending said medley function.

2. The method as recited in claim 1, wherein said step (d) comprises the step of:

(d) continuously playing randomly selected songs from said selected song class seriatim on the karaoke television by providing accompaniment music, lyrics, and background scenes from each song until a user's mark for an immediately preceding song is lower than said minimum mark.

3. The method as recited in claim 1, wherein said step (d) comprises the step of:

(d) continuously playing randomly selected songs from said selected song class seriatim on the karaoke television by providing accompaniment music, lyrics, and background scenes for each song until a number of completely played songs is equal to said target number.

4. The method as recited in claim 1, wherein said step (d) comprises the steps of:

(d) playing randomly selected songs from said selected song class seriatim on the karaoke television by:

(i) displaying a song title of a randomly selected song from said song class to thereby define a played song;

(ii) providing accompaniment music, lyrics, and background scenes for said played song until said played song is finished;

(iii) generating a user's mark for said played song;

(iv) incrementing a count of played songs by 1; and (v) repeatedly performing said steps (d)(i) through (d)(iv) until said determined ending condition is satisfied.

5. The method as recited in claim 1, where said step (d) comprises the step of:

(d) continuously playing randomly selected songs from said selected song class seriatim on the karaoke television by providing accompaniment music, lyrics, and background scenes until a predetermined end condition is satisfied, wherein said end condition comprises at least one of: a) a user's mark for an immediately preceding song falling below said minimum mark and b) a number of completely played songs being equal to said target number.

6. A method for controlling execution of a medley function in a karaoke television comprising the steps of:

(a) operating a medley function key;

(b) displaying an initial screen listing classes of songs;

(c) numerically selecting one said song classes as a selected song class;

(d) setting a reference mark;

(e) setting a target number of challenging songs;

(f) determining whether a performance start command is received;

(g) displaying a title of a randomly selected song from said selected song class;

(h) providing lyrics, background picture, accompaniment information corresponding to said title of said randomly selected song and playing associated accompaniment music and song;

(i) determining when said selected song is finished;

(j) grading said selected song to provide a user's mark;

(k) determining whether said user's mark exceeds said reference mark when said selected song is finished;

(l) continuing play of accompaniment music and song for a next randomly selected song from said selected song class only when said user's mark exceeds said reference mark;

(m) determining whether the currently-played number of songs is the same as that of said target number when said user's mark exceeds said reference mark to thereby continuously reproduce accompaniment music and songs if the number of said played songs and said target number differ and to display a celebrator message when the number of said played songs and said target number are the same.

* * * * *